US 6,708,992 B1

(12) United States Patent
Vargas

(10) Patent No.: US 6,708,992 B1
(45) Date of Patent: Mar. 23, 2004

(54) CHILD-CARRYING AND DIAPER CHANGING CART

(76) Inventor: Cataline Vargas, 144-37 Grand Central Pkwy., Kew Gardens, NY (US) 11435

( * ) Notice: Subject to any disclaimer, the term of this patent is extended or adjusted under 35 U.S.C. 154(b) by 0 days.

(21) Appl. No.: 09/636,619

(22) Filed: Aug. 11, 2000

(51) Int. Cl.⁷ .................................................. B62B 7/00
(52) U.S. Cl. ............................... 280/47.38; 280/47.35; 280/657
(58) Field of Search .......................... 280/47.35, 47.38, 280/47.34, 47.25, 47.26, 647, 650, 657, 658, 642

(56) References Cited

U.S. PATENT DOCUMENTS

| 526,972 | A | * | 10/1894 | Jaimison ..................... 280/38 |
| 2,635,797 | A | * | 4/1953 | Siebert ........................ 224/409 |
| 2,645,502 | A | * | 7/1953 | Collins et al. ................. 280/31 |
| 3,330,576 | A | * | 7/1967 | Willis ......................... 280/79.3 |
| 3,436,770 | A | * | 4/1969 | Turner ............................. 5/94 |
| 4,082,349 | A | * | 4/1978 | Ballenger ................. 297/183.6 |
| 4,116,465 | A | | 9/1978 | Maclaren |
| 4,953,887 | A | | 9/1990 | Takahashi et al. |
| 5,046,651 | A | | 9/1991 | Dagdagan |
| 5,074,575 | A | | 12/1991 | Bigo |
| 5,113,793 | A | * | 5/1992 | Leader et al. ................ 119/453 |
| D366,546 | S | | 1/1996 | Schaub et al. |
| 5,580,072 | A | | 12/1996 | Monneret |
| 5,915,723 | A | * | 6/1999 | Austin ........................ 280/651 |
| 5,921,574 | A | * | 7/1999 | Driessen et al. ......... 280/655.1 |
| 6,264,153 | B1 | * | 7/2001 | Ragner et al. ........... 248/311.2 |

* cited by examiner

Primary Examiner—James S. McClellan

(57) ABSTRACT

A child-carrying and diaper-changing cart for providing a mobile stand that is prevented from tipping. The child-carrying and diaper-changing cart includes a base assembly including a frame, legs depending from the frame, and wheels rotatably mounted to ends of the legs; and also includes a first basket member being securely disposed upon the frame; and further includes a second basket member being securely mounted to the legs intermediate of the first basket member and the wheels; and also includes a handle assembly being securely attached to the first basket member; and further includes a skirt assembly including skirt fastening members detachably attached to the frame and also including a skirt fastened to the frame with the skirt fastening members and extending about the base assembly; and also includes a mat removably disposed upon a bottom of the first basket member and including a plurality of padded sections; and further includes a bottle holding assembly being detachably attached to the first basket member.

16 Claims, 5 Drawing Sheets

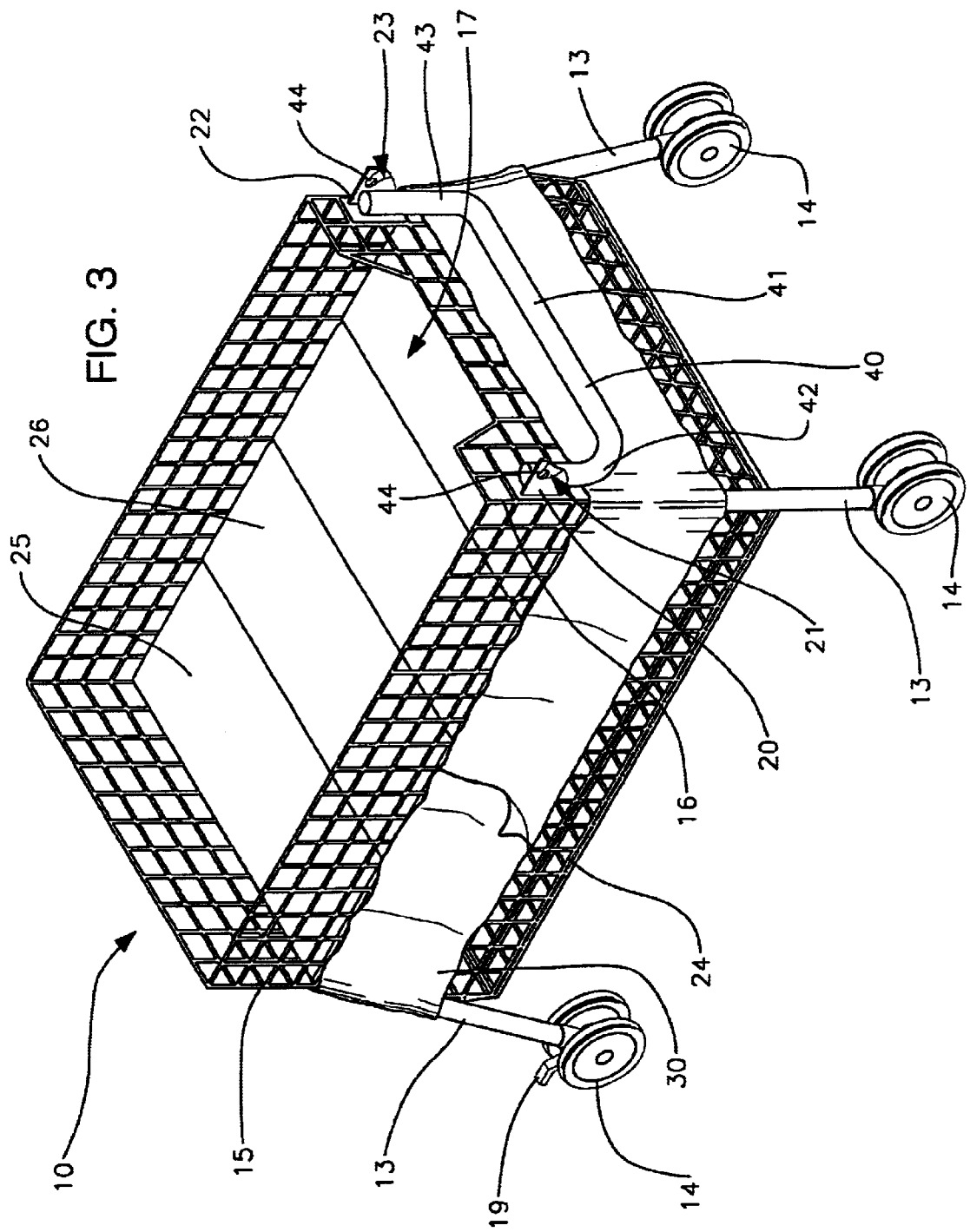

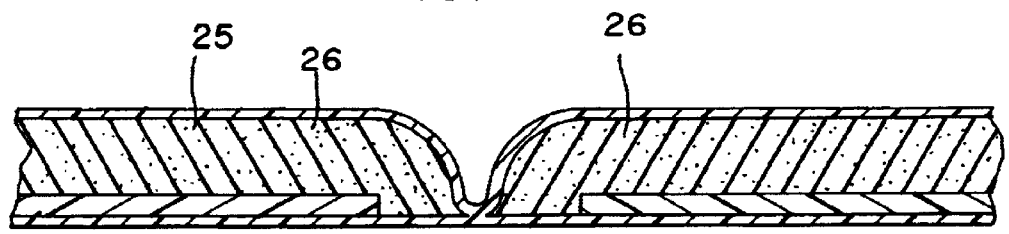
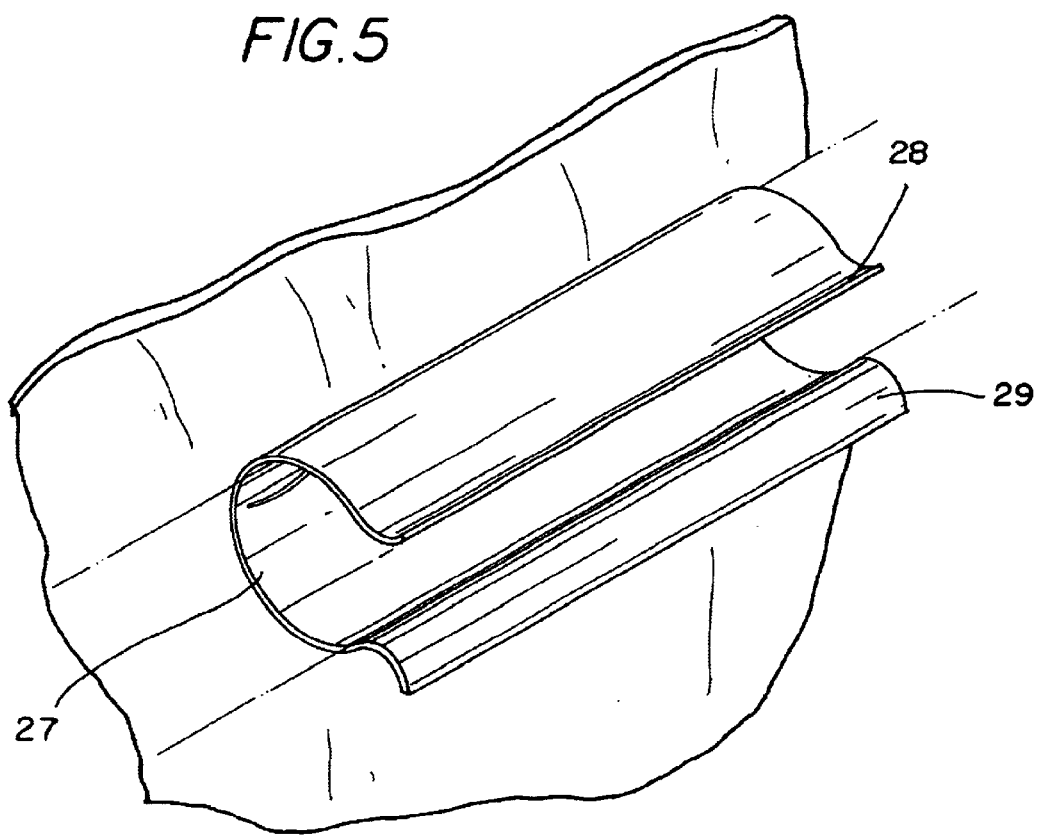

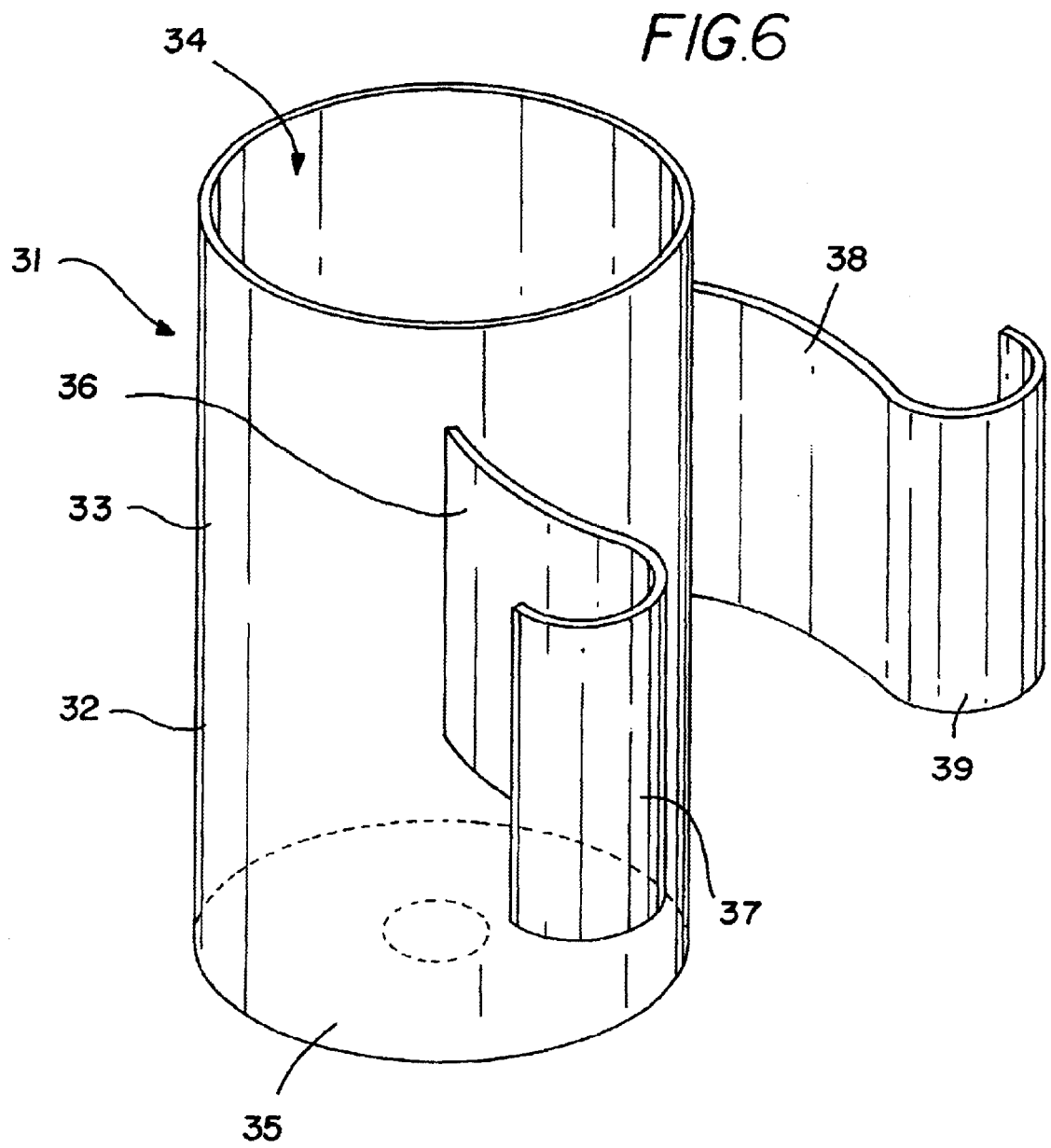

CHILD-CARRYING AND DIAPER CHANGING CART

BACKGROUND OF THE INVENTION

1. Field of the Invention

The present invention relates to a child carrier wagon and more particularly pertains to a new child-carrying and diaper-changing cart for providing a mobile stand that is prevented from tipping.

2. Description of the Prior Art

The use of a child carrier wagon is known in the prior art. More specifically, a child carrier wagon heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,116,465; U.S. Pat. No. 5,580,072; U.S. Pat. No. 5,074,575; U.S. Pat. No. 4,953,887; U.S. Pat. No. 5,046,651; and U.S. Pat. No. Des. 366,546.

While these devices fulfill their respective, particular objectives and requirements, the aforementioned patents do not disclose a new child-carrying and diaper-changing cart. The inventive device includes a base assembly including a frame, legs depending from the frame, and wheels rotatably mounted to ends of the legs; and also includes a first basket member being securely disposed upon the frame; and further includes a second basket member being securely mounted to the legs intermediate of the first basket member and the wheels; and also includes a handle assembly being securely attached to the first basket member; and further includes a skirt assembly including skirt fastening members detachably attached to the frame and also including a skirt fastened to the frame with the skirt fastening members and extending about the base assembly; and also includes a mat removably disposed upon a bottom of the first basket member and including a plurality of padded sections; and further includes a bottle holding assembly being detachably attached to the first basket member.

In these respects, the child-carrying and diaper-changing cart according to the present invention substantially departs from the conventional concepts and designs of the prior art, and in so doing provides an apparatus primarily developed for the purpose of providing a mobile stand that is prevented from tipping.

SUMMARY OF THE INVENTION

In view of the foregoing disadvantages inherent in the known types of child carrier wagon now present in the prior art, the present invention provides a new child-carrying and diaper-changing cart construction wherein the same can be utilized for providing a mobile stand that is prevented from tipping.

The general purpose of the present invention, which will be described subsequently in greater detail, is to provide a new child-carrying and diaper-changing cart which has many of the advantages of the child carrier wagon mentioned heretofore and many novel features that result in a new child-carrying and diaper-changing cart which is not anticipated, rendered obvious, suggested, or even implied by any of the prior art child carrier wagon, either alone or in any combination thereof.

To attain this, the present invention generally comprises a base assembly including a frame, legs depending from the frame, and wheels rotatably mounted to ends of the legs; and also includes a first basket member being securely disposed upon the frame; and further includes a second basket member being securely mounted to the legs intermediate of the first basket member and the wheels; and also includes a handle assembly being securely attached to the first basket member; and further includes a skirt assembly including skirt fastening members detachably attached to the frame and also including a skirt fastened to the frame with the skirt fastening members and extending about the base assembly; and also includes a mat removably disposed upon a bottom of the first basket member and including a plurality of padded sections; and further includes a bottle holding assembly being detachably attached to the first basket member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the-spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child-carrying and diaper-changing cart which has many of the advantages of the child carrier wagon mentioned heretofore and many novel features that result in a new child-carrying and diaper-changing cart which is not anticipated, rendered obvious, suggested, or even implied by any of the prior art child carrier wagon, either alone or in any combination thereof.

It is another object of the present invention to provide a new child-carrying and diaper-changing cart which may be easily and efficiently manufactured and marketed.

It is a further object of the present invention to provide a new child-carrying and diaper-changing cart which is of a durable and reliable construction.

An even further object of the present invention is to provide a new child-carrying and diaper-changing cart which is susceptible of a low cost of manufacture with regard to both materials and labor, and which accordingly is then susceptible of low prices of sale to the consuming public, thereby making such child-carrying and diaper-changing cart economically available to the buying public.

Still yet another object of the present invention is to provide a new child-carrying and diaper-changing cart which provides in the apparatuses and methods of the prior art some of the advantages thereof, while simultaneously overcoming some of the disadvantages normally associated therewith.

Still another object of the present invention is to provide a new child-carrying and diaper-changing cart for providing a mobile stand that is prevented from tipping.

Yet another object of the present invention is to provide a new child-carrying and diaper-changing cart which includes a base assembly including a frame, legs depending from the frame, and wheels rotatably mounted to ends of the legs; and also includes a first basket member being securely disposed upon the frame; and further includes a second basket member being securely mounted to the legs intermediate of the first basket member and the wheels; and also includes a handle assembly being securely attached to the first basket member; and further includes a skirt assembly including skirt fastening members detachably attached to the frame and also including a skirt fastened to the frame with the skirt fastening members and extending about the base assembly; and also includes a mat removably disposed upon a bottom of the first basket member and including a plurality of padded sections; and further includes a bottle holding assembly being detachably attached to the first basket member.

Still yet another object of the present invention is to provide a new child-carrying and diaper-changing cart that allows parents to have greater flexibility and peace of mind knowing where the child is at all times Even still another object of the present invention is to provide a new child-carrying and diaper-changing cart that is easy and convenient to use by the parents without safety concerns.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed:description thereof. Such description makes reference to the annexed drawings wherein:

FIG. 3 is a perspective view of the present invention with the skirt attached thereto.

FIG. 4 is a cross-sectional view of the mat of the present iinvention.

FIG. 5 is a perspective view of one of the skirt fastening members of the present invention.

FIG. 6 is a perspective view of the bottle holding assembly of the present invention.

DESCRIPTION OF THE PREFERRED EMBODIMENT

Figure 1:
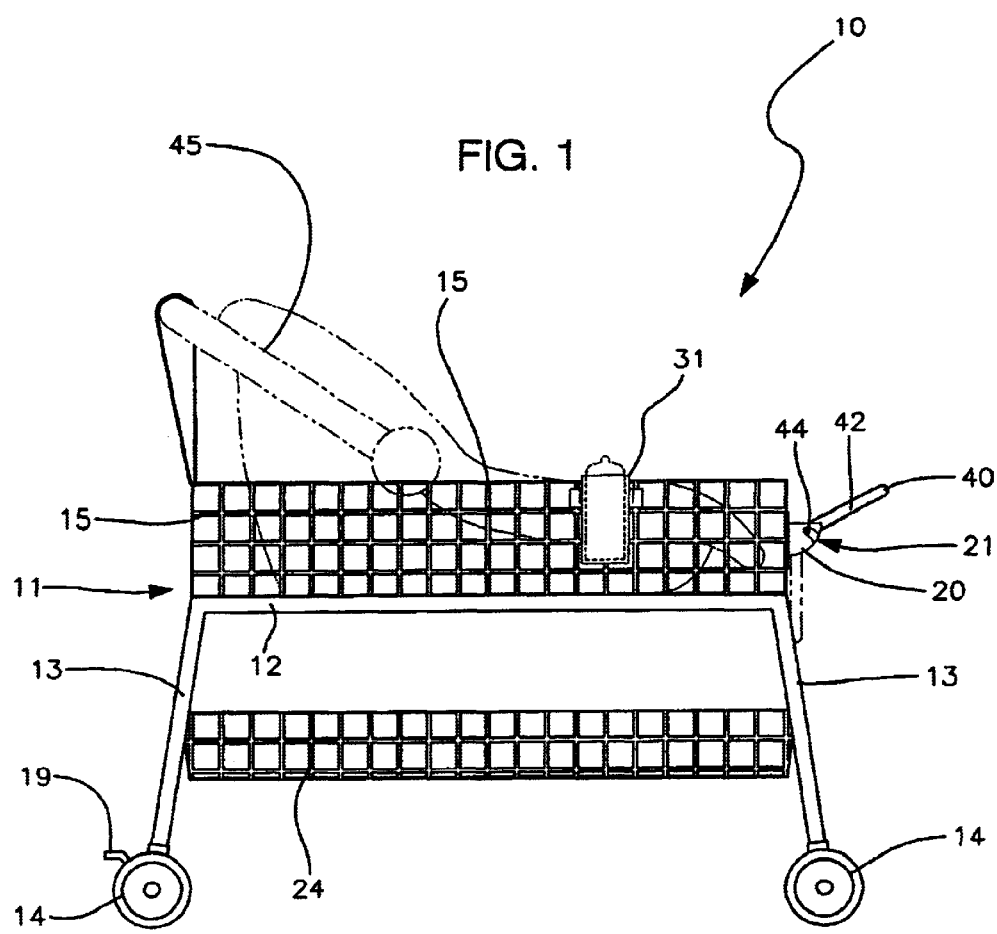
FIG. 1 is a side elevational view of a new child-carrying and diaper-changing cart according to the present invention.
Figure 2:
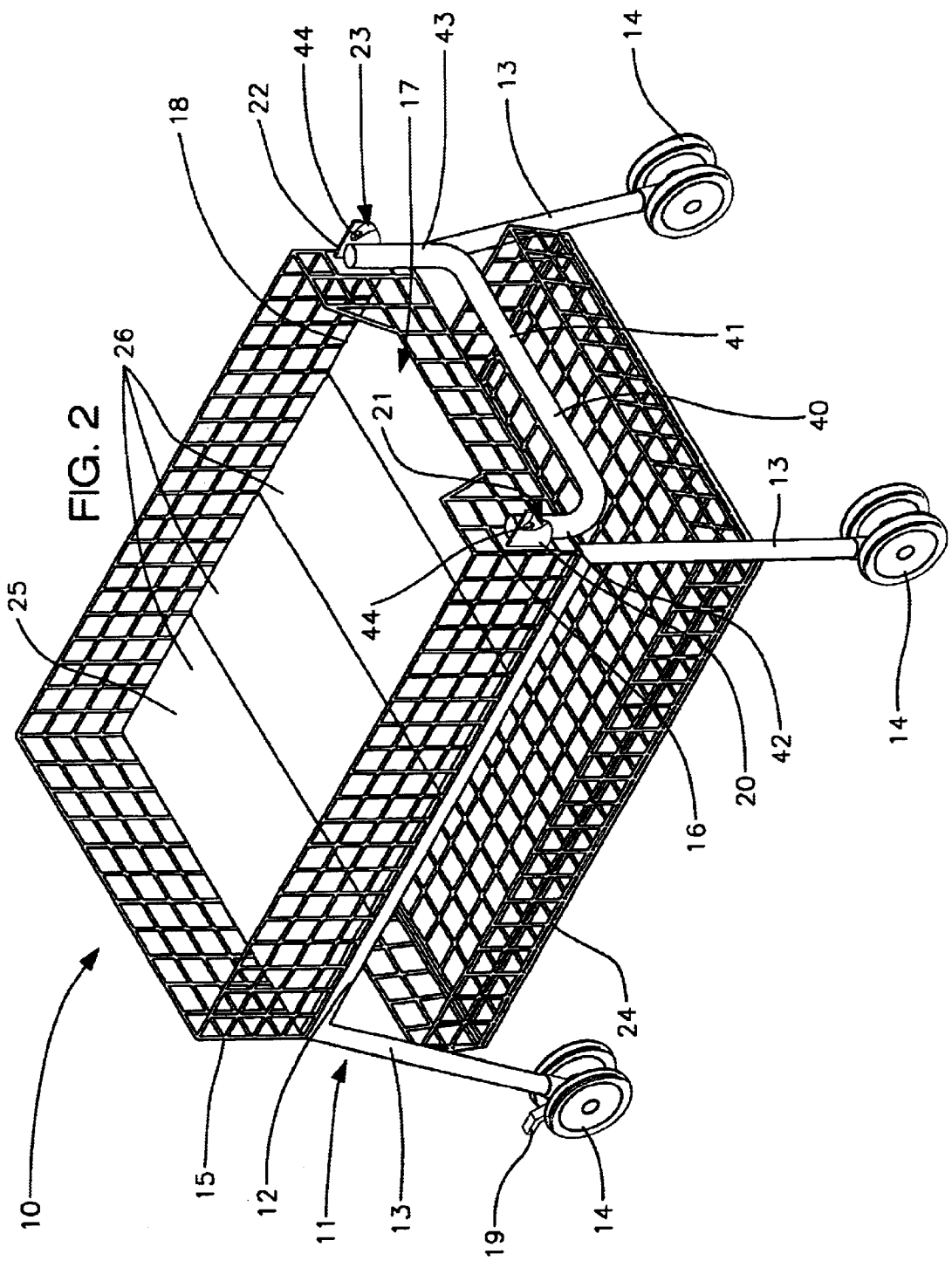
FIG. 2 is a perspective view of the present invention.

With reference now to the drawings, and in particular to FIGS. 1 through 6 thereof, a new child-carrying and diaper-changing cart embodying the principles and concepts of the present invention and generally designated by the reference numeral 10 will be described.

As best illustrated in FIGS. 1 through 6, the child-carrying and diaper-changing cart 10 generally comprises a base assembly 11 including a frame 12, legs 13 conventionally depending from the frame 12, and wheels 14 rotatably and conventionally mounted to ends of the legs 13. The base assembly 11 includes brake members 19 being securely attached to a plurality of the wheels 14 for locking the wheels 14 to prevent the child-carrying and diaper-changing cart 10 from moving. The legs 13 are angled outwardly relative to the frame 12 to essentially stabilize and prevent the child-carrying and diaper-changing cart 10 from tipping over.

A first basket member 15 is securely and conventionally disposed upon the frame 12 with the first basket member 15 having an opening 17 through one end 16 thereof. The opening 17 is adapted to allow legs 13 of a child to extend through while seated upon the first basket member 15. The first basket member 15 is made essentially of wire and has a length of approximately 26 inches and a width of approximately 18 inches and a depth of approximately 10 inches with the opening 17 being approximately 10 inches long and approximately 4 inches wide and extending through a top edge of the end 16 of the first basket member 15. A second basket member 24 is securely and conventionally mounted to the legs 13 intermediate of the first basket member 15 and the wheels 14 for storing items for a user.

A handle assembly is securely and conventionally attached to the first basket member 15. The handle assembly includes bracket members 20,22 securely and conventionally mounted to the end 16 of the first basket-member 15, and also includes a handle member 40 hingedly and lockingly attached to the bracket members 20,22. Each of the bracket members 20,22 includes a slot 21,23 extending inwardly through an edge thereof with the handle assembly also including pin-like members 44 extending through and from ends of the handle member 40 and being adapted to be removably received in the slots 21,23 of the bracket members 20,22. The handle member 40 includes a main portion 41 and end portions 42,43 which are angled relative to the main portion 41.

A skirt assembly includes skirt fastening members 27 detachably attached to the frame 12 and also includes a skirt 30 fastened to the frame 12 with the skirt fastening members 27 and extending about the base assembly 11. Each of the skirt fastening members 27 is an elongate ring member having longitudinal end portions 28,29 which curve away from each other. The ring member 27 is adapted to fasten the skirt 30 about a portion of the frame 12. A mat 25 is removably disposed upon a bottom 18 of the first basket member 15 and includes a plurality of padded sections 26 with the padded sections 26 of the mat 25 being hingedly attached side-by-side and being foldable upon one another.

A bottle holding assembly 31 is detachably attached to the first basket member 15. The bottle holding assembly 31 includes a cylindrical member 32 having a side wall 33, a bottom wall 35, and an open top 34, and also includes clip members 36,38 being spaced apart and extending outwardly from an exterior of the side wall 33. Each of the clip members 36,38 is sinusoidal shaped and has a longitudinally-curved end portion 37,39. The longitudinally-curved end portions 37,39 are curved away from one another. Each one of the clip members 36,38 engages a vertical grid portion of the first basket member 15. Thus, each one of the clip members 36,38 supports an associated side of the cylindrical member 32.

In use, the user positions a child's carrier seat 45 upon the bottom 18 of the first basket member 15 and extends the child's feet through the opening 17 in the end 16 of the first basket member 15 and can move the child-carrying and diaper-changing cart 10 about the house. When the child needs to have one's diaper changed, the user can remove the carrier seat 45 and place the mat 25 upon the bottom 18 of the first basket member 15 and lay the child upon the mat 25. Additionally, the bottle holding assembly 31 allows the user to place the child's bottle in the cylindrical member 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child-carrying and diaper-changing cart comprising:
    a base assembly including a frame, legs depending from said frame, and wheels rotatably mounted to ends of said legs;
    a first basket member being securely disposed upon said frame;
    a second basket member being securely mounted to said legs intermediate of said first basket member and said wheels;
    a handle assembly being securely attached to said first basket member;
    a skirt assembly including skirt fastening members detachably attached to said frame and also including a skirt fastened to said frame with said skirt fastening members and extending about said base assembly;
    a mat removably disposed upon a bottom of said first basket member and including a plurality of padded sections;
    a bottle holding assembly being detachably attached to said first basket member; and
    wherein said bottle holding assembly includes a cylindrical member having a side wall, a bottom wall, and an open top, and also includes clip members being spaced apart and extending outwardly from an exterior of said side wall, each of said clip members is sinusoidal shaped and has a longitudinally-curved end portion, said longitudinally-curved end portions being curved away from one another and being adapted to clip about a portion of said first basket member.

2. A child-carrying and diaper-changing cart as described in claim 1, wherein said base assembly includes a brake members securely attached to a plurality of said wheels for locking said wheels to prevent said child-carrying and diaper-changing cart from moving.

3. A child-carrying and diaper-changing cart as described in claim 1, wherein said legs are angled outwardly relative to said frame to essentially stabilize and prevent said child-carrying and diaper-changing cart from tipping over.

4. A child-carrying and diaper-changing cart as described in claim 1, wherein said first basket member has an opening through one end thereof, said opening being adapted to allow legs of a child to extend through while seated upon said first basket member, said first basket member being made essentially of wire.

5. A child-carrying and diaper-changing cart as described in claim 1, wherein said handle assembly includes bracket members securely mounted to said end of said first basket member, and also includes a handle member hingedly and lockingly attached to said bracket members.

6. A child carrying and diaper changing cart as described in claim 1, wherein each of said bracket members includes a slot extending inwardly through an edge thereof, said handle assembly also including pin-like members extending through and from ends of said handle member and being adapted to be removably received in said slots of said bracket members.

7. A child-carrying and diaper-changing cart as described in claim 1, wherein said handle member includes a main portion and end portions which are angled relative to said main portion.

8. A child-carrying and diaper-changing cart as described in claim 1, wherein each of said skirt fastening members is an elongate ring member having longitudinal end portions which curve away from each other, said ring member being adapted to fasten said skirt about a portion of said frame.

9. A child-carrying and diaper-changing cart as described in claim 1, wherein said padded sections of said mat are hingedly attached side-by-side.

10. A child-carrying and diaper-changing cart, comprising:
    a base assembly including a frame, legs depending from said frame, and wheels rotatably mounted to ends of said legs;
    a first basket member being securely disposed upon said frame;
    a second basket member being securely mounted to said legs intermediate of said first basket member and said wheels;
    a handle assembly being securely attached to said first basket member;
    a skirt assembly including skirt fastening members detachably attached to said frame and also including a skirt fastened to said frame with said skirt fastening members and extending about said base assembly;
    a mat removably disposed upon a bottom of said first basket member and including a plurality of padded sections;
    a bottle holding assembly being detachably attached to said first basket member;
    said base assembly includes a brake members securely attached to a plurality of said wheels for locking said wheels to prevent said child-carrying and diaper-changing cart from moving;

said legs are angled outwardly relative to said frame to essentially stabilize and prevent said child-carrying and diaper-changing cart from tipping over;

said first basket member has an opening through one end thereof, said opening being adapted to allow legs of a child to extend through while seated upon said first basket member, said first basket member being made essentially of wire;

said handle assembly includes bracket members securely mounted to said end of said first basket member, and also includes a handle member hingedly and lockingly attached to said bracket members; and wherein each of said bracket members includes a slot extending inwardly through an edge thereof, said handle assembly also including pin-like members extending through and from ends of said handle member and being adapted to be removably received in said slots of said bracket members.

11. A child-carrying and diaper-changing cart as described in claim 10, wherein said handle member includes a main portion and end portions which are angled relative to said main portion.

12. A child-carrying and diaper-changing cart as described in claim 10, wherein each of said skirt fastening members is an elongate ring member having longitudinal end portions which curve away from each other, said ring member being adapted to fasten said skirt about a portion of said frame.

13. A child-carrying and diaper-changing cart as described in claim 10, wherein said padded sections of said mat are hingedly attached side-by-side.

14. A child-carrying and diaper-changing cart as described in claim 10, wherein said bottle holding assembly includes a cylindrical member having a side wall, a bottom wall, and an open top, and also includes clip members being spaced apart and extending outwardly from an exterior of said side wall.

15. A child-carrying and diaper-changing cart as described in claim 14, wherein each of said clip members is sinusoidal shaped and has a longitudinally-curved end portion, said longitudinally-curved end portions being curved away from one another and being adapted to clip about a portion of said first basket member.

16. A child-carrying and diaper-changing cart comprising:

a base assembly including a frame, legs depending from said frame, and wheels rotatably mounted to ends of said legs, said base assembly including brake members securely attached to a plurality of said wheels for locking said wheels to prevent said child-carrying and diaper-changing cart from moving, said legs being angled outwardly relative to said frame to essentially stabilize and prevent said child-carrying and diaper-changing cart from tipping over;

a first basket member being securely disposed upon said frame, said first basket member having an opening through one end thereof, said opening being adapted to allow legs of a child to extend through while seated upon said first basket member, said first basket member being made essentially of wire and having a length of approximately 26 inches and a width of approximately 18 inches and a depth of approximately 10 inches, said opening being approximately 10 inches long and approximately 4 inches wide and extending through a top edge of said end of said first basket member;

a second basket member being securely mounted to said legs intermediate of said first basket member and said wheels;

a handle assembly being securely attached to said first basket member, said handle assembly including bracket members securely mounted to said end of said first basket member, and also including a handle member hingedly and lockingly attached to said bracket members, each of said bracket members including a slot extending inwardly through an edge thereof, said handle assembly also including pin-like members extending through and from ends of said handle member and being adapted to be removably received in said slots of said bracket members, said handle member including a main portion and end portions which are angled relative to said main portion;

a skirt assembly including skirt fastening members detachably attached to said frame and also including a skirt fastened to said frame with said skirt fastening members and extending about said base assembly, each of said skirt fastening members being an elongate ring member having longitudinal end portions which curve away from each other, said ring member being adapted to fasten said skirt about a portion of said frame;

a mat removably disposed upon a bottom of said first basket member and including a plurality of padded sections, said padded sections of said mat being hingedly attached side-by-side and being foldable upon one another; and a bottle holding assembly being detachably attached to said first basket member, said bottle holding assembly including a cylindrical member having a side wall, a bottom wall, and an open top, and also including clip members being spaced apart and extending outwardly from an exterior of said side wall, each of said clip members being sinusoidal shaped and having a longitudinally-curved end portion, said longitudinally-curved end portions being curved away from one another and being adapted to clip about a portion of said first basket member.

* * * * *